United States Patent [19]

Merzhanov et al.

[11] Patent Number: 4,988,480

[45] Date of Patent: Jan. 29, 1991

[54] METHOD FOR MAKING A COMPOSITE

[76] Inventors: Alexandr G. Merzhanov; Inna P. Borovinskaya, both of ulitsa Tretya, 3, kv. 2, Moskovskaya oblast, poselok Chernogolovka, U.S.S.R.; Alexandr N. Pitjulin, ulitsa Pervaya, 2a, kv. 26, Moskovskaya oblast, Chermogolovka, U.S.S.R.; Viktor I. Ratnikov, ulitsa Tsentralnaya, 6, kv. 41, Moskovskaya oblast, Chermogolovka, U.S.S.R.; Konstantin L. Epishin, proezd Stroitelei, 1b, komnate 334, Moskovskaya oblast, Chernogolovka, U.S.S.R.; Vadim L. Kvanin, ulitsa Oxkaya, 42/1, korpus 1, kv. 42, Moscow, U.S.S.R.

[21] Appl. No.: 566,358

[22] PCT Filed: Dec. 20, 1988

[86] PCT No.: PCT/FR88/00270

§ 371 Date: Aug. 23, 1990

§ 102(e) Date: Aug. 23, 1990

[87] PCT Pub. No.: WO90/07014

PCT Pub. Date: Jun. 28, 1990

[51] Int. Cl.⁵ ............................................. B22F 00/00

[52] U.S. Cl. .................................... 419/11; 419/12; 419/13; 419/17; 419/19; 419/25; 419/28; 419/54; 419/55; 419/45

[58] Field of Search .................... 419/11, 12, 13, 17, 419/19, 25, 28, 45, 54, 55

[56] References Cited

U.S. PATENT DOCUMENTS

| | | | |
|---|---|---|---|
| 4,673,550 | 6/1987 | Dallaire et al. | 419/12 |
| 4,778,649 | 10/1988 | Niino et al. | 419/12 |
| 4,906,295 | 3/1990 | Miyamoto et al. | 419/11 |
| 4,946,643 | 8/1990 | Dunmead et al. | 419/12 |

Primary Examiner—Stephen J. Lechert, Jr.
Attorney, Agent, or Firm—Burgess, Ryan & Wayne

[57] ABSTRACT

The proposed invention is used for the manufacture from the obtained composite of cutting tools, hard alloy tooling, dies and other products. A method according to the invention involves preparing a mixture, compacting it, placing the mixture into a synthesis zone, igniting the mixture, with subsequent reaction of components of the mixture under combustion conditions. Then cure is carried out during a period ranging from about 0.1 seconds to about 0.5 hours, and the hot combustion products are compacted under pressure at an average pressure rise rate ranging from about 10 to about 2000 kgf/cm².s, with subsequent cure of the compacted product under isobaric conditions to complete homogenization of the composite, with subsequent cooling thereof to obtain an end composite.

19 Claims, 1 Drawing Sheet

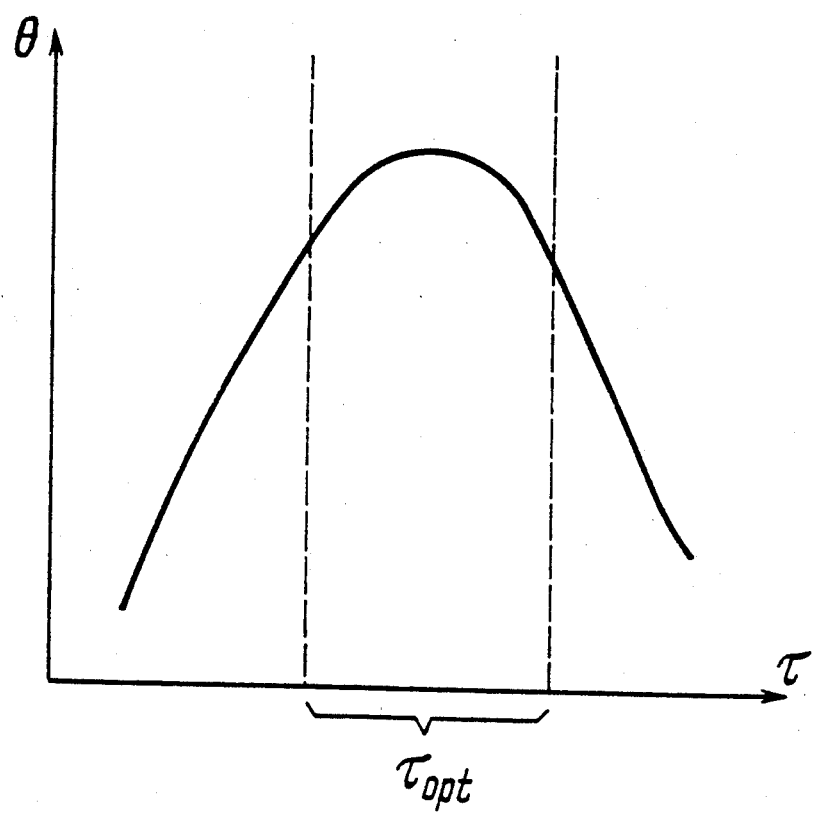
1 Figure

ସ୍ଥ4,988,480

METHOD FOR MAKING A COMPOSITE

TECHNICAL FIELD

The invention relates to the powder metallurgy, and more specifically, it deals with a method for making a composite material based on high-melting compounds of metals of group III-VI, VIII of the periodic table of the chemical elements.

BACKGROUND ART

The efficient use of composites in many fields of technology is due to a number of their valuable properties.

Such composites as, e.g. hard alloys exhibit a high hardness (86–94 HRA) in combination with high wear resistance, i.e. high resistance to wear in friction with both metals and nonmetals.

Another type of composites—carbide-containing steels-features a hardness which is close to that of cermets and a strength which is almost identical to that of steel.

Certain composites are capable to a large extent of retaining their properties at high temperatures.

It is most advantageous to use composites for the manufacture of cutting tools, dies and other products.

There are many diverse methods for making composites.

A most widely used method for making hard alloy materials (V. I. Tretiyakov "Fundamentals of Physical Metallurgy and Manufacturing Processes for Making Sintered Hard Alloys" (in Russian), 1976, Metallurgia Publishing House, Moscow, p.7), comprises preparing high-melting compounds with subsequent employment of powder metallurgy techniques comprising blending powders of the resultant high-melting compounds with a binder metal, pressing compacts and sintering them at 1350°–1550° C. for several hours in vacuum or hydrogen electric furnaces.

High-melting compounds for hard alloys (carbides, borides, nitrides of transition metals) are produced by synthesis from respective metals (or their oxides) and nonmetals (boron, carbon, nitrogen) in electric furnaces at 1600°–2200° C. during several hours (ibid., pp. 265-293).

Another, more economically advanced and simpler method for making high-melting compounds (U.S. Pat. No. 3,726,643) comprises blending at least one metal selected from groups IV–VI of the periodic table of the chemical elements with at least nonmetal selected from carbon, nitrogen, boron, silicon, oxygen, phosphorus, fluorine, chlorine, and locally igniting the resultant mixture by any appropriate known method, e.g. using a tungsten filament. A temperature is thus provided which is necessary for initiating an exothermal reaction between metals and nonmetals in a small area of the mixture.

Further reaction of components of the mixture does not call for use of external energy supplies for heating and occurs on the account of heat of the exothermal reaction proper. The reaction propagates spontaneously through the mixture in the form of combustion due to heat transfer from a heated mixture layer to a cold layer at a combustion speed of 4 to 16 cm/s.

This method for making hard alloys is a multiple-stage process: it comprises a stage of preliminary preparation of high-melting compounds and their subsequent processing using known powder metallurgy techniques.

In addition, this method is associated with high power requirements and does not allow high-density homogeneous materials based on certain high-melting compounds such as $TiB_2$-based compounds to be produced because of their poor sintering capacity.

Known in the art is a method for making a hard alloy material (U.S. Pat. No. 4,431,448) having a porosity of less than 1% of the following composition in % by mass:

| titanium diboride | 40–60 |
|---|---|
| binder | 3–30 |
| tatanium carbide | the balance, | comprising blending by mixing powders of titanium, boron, carbon and at least one of metals of subgroup IB of the periodic table of the chemical elements inactive with respect to boron or an alloy based on one of the abovementioned metals or powders of metals forming said alloy under exothermal reaction conditions. The mixture is then compacted and locally ignited to initiate an exothermal reaction between titanium and boron and carbon which then goes on spontaneously under combustion conditions and propagates through the mixture by heat transfer from a heated mixture layer to a cold layer. When the exothermal reaction is over, the resultant solid-liquid reaction mass is pressed to a porosity below 1%.

The abovedescribed method features simplicity of process and cost-effectiveness. Its emploment makes it possible to prepare materials with high hardness and wear resistance with a high enough strength. The use of the abovementioned combination of steps allows porosity of a hard alloy to be lowered to 1% and even lower.

However, the materials prepared by using the abovedescribed method have inadequate uniformity of chemical composition and physico-mechanical properties.

This is due to the fact that completeness of reaction between components of the mixture in the combustion zone is below unity so that combustion products contain unreacted components non-uniformly dictrubuted over the volume of the combustion products.

This results in impaired chemical uniformity of a composite.

At the same time, a disruption of thermal isotropy of the combustion products occurs so that they are non-uniformly compacted thus impairing uniformity of physico-mechanical properties of a composite.

Known in the art is a method for making a hard alloy material (EP No. 165707 A2), comprising blending at least one metallic element of groups III, IVa, Va and VIa of the periodic table of the chemical elements and at least one compound of at least one element from these groups individually or in combination, at least one non-metallic element selected from the group of boron, carbon, nitrogen and silicon, and at least one compound of at least one of said elements taken individually or in combustion, and a binder component, compacting the mixture, placing the mixture into a synthesis zone, igniting the mixture, with subsequent reaction between the components of the mixture under combustion conditions, and compacting the hot combustion products to obtain an end product.

This method makes it possible to prepare cermets based on various high-melting compounds, the resultant materials featuring high hardness and very low porosity (less than 1%).

Homogeneity of the synthetic materials is, however, inadequate which is due to incomplete reaction between components of the starting mixture, non-uniform compaction of combustion products and substantial thermal load upon the end product.

Non-uniformity of hard alloys produced by the abovedescribed method may result in an instability and even in a material impairment of operating properties of parts made from such materials in certain applications.

SUMMARY OF THE INVENTION

It is an object of the invention to provide a method for making a composite which makes it possible to achieve a high uniformity of chemical composition and density of the composite while retaining a low porosity.

This object is accomplished by that in a method for making a composite, comprising blending a mixture containing at least one metallic element of groups III–VI, VIII of the periodic table of the chemical elements and at least one compound of at least one of the elements of said groups taken individually or in combination, at least one nonmetallic element of groups III–VI of the periodic table of the chemical element and at least one compound of at least one of the elements of said groups taken individually or in combination, and a binder component, compacting the mixture, placing the mixture into a synthesis zone, igniting the mixture with subsequent reaction between the components of the mixture under combustion conditions, compacting the hot combustion products to obtain an end composite product, according to the invention, the mixture is cured during a period ranging from about 0.1 s to about 0.5 hours after the ignition and before compaction, the hot combustion products being compacted under pressure at an average rate of pressure rise ranging from about 10 to about 2000 kgf/cm$^2$ with subsequent cure of the compacted product under isobaric conditions to complete homogenization of the composite, and cooling thereof.

The employment of the method according to the invention makes it possible to achieve high uniformity of chemical composition and density of the composite while retaining its low porosity.

Blending a mixture containing at least one metallic element of groups III–VI, VIII of the periodic table of the chemical elements and at least one compound of at least one of the elements of said groups taken individually or in combination, at least one nonmetallic element of groups III–VI of the periodic table of the chemical elements and at least one compound of at least one of the elements of said groups taken individually or in combination, and a binder component, makes it possible to prepare a mixture which is capable of taking part in a high-temperature reaction under combustion conditions. When the mixture is ignited, a combustion reaction is initiated, which occurs spontaneously by propagation of the combustion zone (reaction front) through the mixture by heat transfer from a hot layer to a cold layer.

Compounds of respective elements or components of the mixture are formed during combustion, and melting and spread of the binder occur.

However, when the mixture components react under combustion conditions, a substantial gas release takes place, the gases being mainly in the form of surface-absorbed gases and readily sublimating impurities.

A substantial gas pressure is thus built up within the porous bulk of the combustion products which counteracts the compaction.

In addition, completeness of reaction of the mixture components at the combustion front does not amount to 100%, i.e. the reaction between the components continues after the combustion front has passed through the mixture.

To ensure completeness of reaction of the starting components of the mixture, homogenize the combustion products and remove the released gases, it is necessary to cure the combustion products for a certain time before compaction.

The cure time depends on many factors such as the environment and mixture blending time, relative density of the mixture after the compaction, the characteristic size of the mixture volume, and other factors.

At the same time, when the cure is carried out, an intensive lowering of temperature of the combustion products occurs, i.e. conditions for their compaction are detriorated. The qualitative relationship of relative density of a composite of $(\theta)$ versus cure time $(\tau)$ is shown in the accompanying drawing.

It can be seen from the diagram in the accompanying drawing that there is an area of optimum values of the cure time before compaction of the combustion products $(\tau_{opt.})$ in which relative density of the compite is at its maximum.

With $\tau$ below $\tau_{opt.}$ the gasified impurities are trapped and dissolved in the material upon cooling so as to impair homogeneity.

In addition, the premature compaction of the combustion products results in incomplete afterreaction of the mixture components which also impairs homogeneity of the composite. These reasons explain the lower limit of the cure time.

With $\tau$ greater than $\tau_{opt.}$ a material decrease in temperature of the combustion products occurs which results in incomplete compaction of the composite, i.e. in an increase in its porosity.

In other words, the upper limit of the cure time is determined by the possibility of complete compaction of the material.

After the cure, compaction of hot combustion products under pressure is started.

In this case it is the average rate of pressure rise that counts. When the mixture burns in smalle volumes with a low "store" of heat, the combustion products should be rapidly compacted before their temperature drops to a critical value (the critical temperature is the temperature of the combustion products at which their complete compaction becomes impossible). In this case the average rate of pressure rise is high.

However, in compacting large volumes of the mixture, a rapid pressure rise may bring about non-uniformity of density of the composite because of the prevailing compaction of the surface layers.

Therefore, the specific range of the average rate of pressure rise claimed in this application is determined by the following cosiderations:

the lower limit is dictated by the possibility of uniform compaction of a large volume of combustion products to a substantially nonporous state, i.e. porosity of the finished composite increases with a decrease in the rate of pressure rise;

the upper limit is determined by the possibility of complete compaction of a small volume of the combustion products while retaining high homogeneity of the composite, i.e. with a further increase in the average rate of pressure rise, homogeneity of the composite is impaired.

Properties of a composite are strongly influenced by the time of cure of the compacted product under isobaric conditions. In addition to further compaction during this cure of the material, the material is homogenized, i.e. concentration profiles over the material volume are levelled off, micropores are uniformly filled-up, and srtuctural defects come to the surface of the material.

Therefore, the curs under isobaric conditions makes it possible to achieve a substantial improvement of homogeneity of the composite.

A composite is formed under exteme conditions. At the same time, the high-melting component and the binder component frequently have different coefficients of thermal expansion. For this reason, the material features enormous thermal stresses after the cure under isobaric conditions.

It is therefore desirable to carry out a heat treatment of the composite before cooling. Thus annealing allows structural and thermal stresses in the material to be relieved, i.e. its structural uniformity can be enhanced.

Another kind of a heat treatment—normalization—makes it possible to enhance uniformity of the binder component, i.e. it also brings about the preparation of a more homogeneous material.

An additional advantage of a heat treatment may reside in an improvement of machinability of a composite, e.g. after tempering.

It is preferred that a heat treatment of the resultant composite be carried out after cooling.

First, ageing processes occur intensively in certain materials. Thus in materials having a titanium-based binder, homogeneity of the binder component may degrade with time as a result of transition of the high-temperature $\beta$-modification into a low-temperature $\alpha$-modification. Such type of an additional heat treatment as hardening makes it possible to enhance homogeneity of the composite in such applications.

Cooling of the resultant composite is preferably carried out at a rate of from about 10 to about 5000 deg./h.

The rate of cooling has a substantial effect on properties of a composite.

With a very high cooling rate numerous defects can form in the material so as to result in its non-uniformity. This determines the upper limit of the cooling rate.

With very low cooling rates undesirable processes can occur in the material such as recrystallization, a change in phase composition of individual components of the composite, and the like. In other words, the lower limit of the cooling rate is chosen taking into account conditions necessary for retaining high homogeneity of the composite. The upper cooling rate limit is determined by conditions for preservation of the material, i.e. the material can be destructed if the upper cooling rate limit is overpassed.

It should be noted that the cooling rate should be chosen taking into account composition of a composite.

As mentioned above, a substantial gas release occurs during combustion of the mixture, and the gas saturation of the mixture may be as high as 160 $cm^3/g$ and even higher.

Thus the mixture can be broken-up by gas flows during combustion which will result in impaired homogeneity of a composite material.

To avoid this, it is preferred that at least ignition of the mixture and the initial stage of the cure before compaction of the combustion products be carried out under a pressure ranging from about 10 to about 1000 $kgf/cm^2$ (the initial stage of cure is a time interval during which combustion of the mixture is mainly completed).

The lower pressure limit is determined by conditions necessary for keeping continuity of the composite.

The upper limit is chosen taking into account the following considerations. Upon an increase in pressure, a deceleration of degassing of the combustion products occurs, i.e. it is necessary to have a longer cure period which results in an increase in porosity of the composite. At the same time, a pressure increase results in an intensified heat removal from hot combustion products, i.e. in lowering of their temperature and in impaired conditions for the compaction of the composite.

In certain cases a strong gas release takes place not only during combustion of the mixture, but also in the process of afterreaction between components of the mixture, e.g. in case there are compounds in the mixture which react with the formation of gaseous products. The following reactions may be cited as examples:

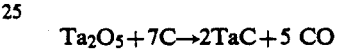

or

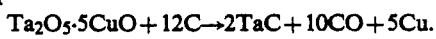

In such cases, it is preferred that the entire cure before compaction of the combustion products be carried out under a pressure of from about 10 to about 1000 $kgf/cm^2$. The choice of the limit pressure values has been made taking into account the abovedescribed considerations.

The rate of combustion of the mixture used in the method according to the invention may range from several fractions of millimeter up to several scores of centimeters per second. The combustion temperature ranges from 1000° to 4000° C.

During combustion of the mixture with a low specific heat release, i.e. with low values of combustion rate and temperature, a substantial three-dimensional non-isotermy of the combustion products may occur thus impairing homogeneity of the composite.

Moreover, certain mixtures has a specific heat release which is so low that propagation of the combustion front there through is not possible without additional heat being applied.

In this case it is preferred to heat the mixture by means of an external energy source before ignition (induction heating, heating with direct flow of current, heating by means of a "chemical oven", furnace heating, heating with an ultrasinic field, and the like) to a temperature from about 100° to about 1200° C.

This technique is sometimes used for raising tepmerature of the combustion products, i.e. for intensifying compaction and homogenization so as to enhance homogeneity.

It should be noted that heating of the mixture before ignition is only effective if the combustion products are cured before compaction, the compacted product is cured under isobaric conditions, and the pressure rise rate is optimum. This is explained by the fact that reaction of the mixture with a low specific heat release occurs with a comparatively low degree of conversion of elements in the combustion wave, i.e. there is a substantial afterburning zone. The afterreaction of the mixture components in the afterburning zone as shown above is only possible in a cure before compaction of the combustion products is carried out. A slow after-reaction of the mixture components results in an impaired homogeneity of the material which is compensated for by carrying out compaction of the combustion products at an optimum rate of pressure rise and cure of the compacted product under isobaric conditions.

The lower limit of the temperature to which the mixture is heated before ignition is determined by conditions necessary for preparing a homogeneous composite, i.e. with a lower temperature a substantial quantity of unreacted components nay be left in the combustion products thus bringing about non-uniformity of the material and an increase in its porosity.

The upper limit is caused by conditions of self-combustion of the mixture, i.e. a spontaneous initiation of reaction can take place at higher temperatures.

In preparing composites in which individual components feature a high melting point, it is recommended that the mixture be placed in a porous heat insulating envelope after the compaction.

A cooling can otherwise take place, hence underburning or incomplete compaction of surface layers of the material can occur so as to impair homogeneity and lower density.

Composites with a high melting point should be compacted with an optimum pressure rise rate. Otherwise the composite would have a high non-uniformity of density, i.e. it would be non-uniform.

In case a composite has a high melting point and the starting mixture has a substantial gas saturation, it is preferred that the heat insulating envelope have an open porosity, the pore volume being about 60% and less of the volume of the heat insulating envelope.

In this case degassing of the combustion products is facilitated so as to bring about an increase in the single-phase character of the composite.

It should be noted that synthesis of such materials requires a compulsory cure before compaction of the combustion products and cure of the compacted products under isobaric conditions.

The upper limit of the open porosity is determined in accordance with strength of the heat insulating envelope, i.e. the heat insulating envelope may be broken-up with a further increase in porosity so that a dense and homogeneous material cannot be prepared.

The cure before the compaction of the combustion products and the cure of the compacted products under isobaric conditions and compaction of the combustion products at optimum rate of pressure rise make it possible to:

(1) use wastes of a metal of III–VI, III groups of the periodic table of the chemical elements and/or its alloy as a metallic element;
(2) use a nometallic element of groups III–VI of the periodic table of the chemical elements in the form of production wastes as a nonmetallic element;
(3) use a binder components from production wastes as a binder component.

Wastes of various kinds of metal and alloy machining such as cutting, grinding, and the like can be used as a metallic element.

Various undergrade residues formed during manufacture of metals and alloys or products thereof can also be used.

Both machining wastes such as graphite fines and various undergrade residues of, e.g. carbon or boron fibers, silicon mirrors, waste graphite electrodes, and the like can be used as a nonmetallic element.

A binder can be in the form of any component from production wastes meeting certain requirements. It can be in the form of wastes from machining of steel, cast iron, metals, nonmetals, and the like.

Wastes of various processes are generally strongly contaminated with extraneous admixtures. These admixtures are frequently sublimated during high-temperature reactions between the mixture components thereby resulting in an increase in gas release during synthesis.

Therefore, it is only the conduct of the cure before the compaction of the combustion products that allows the combustion products to be completely degassed which, as mentioned above, results in a dense and highly homogeneous composite being produced.

At the same time, the mixture containing production wastes features lower combustion rate and temperature, i.e. the compaction and homogenization processes during the compaction of the combustion products occur slower than in case pure elements are used.

Therefore, the conduct of the cure of the compacted products under isobaric conditions and compaction of the material with an optimum rate of pressure rise become especially important. It is only these technique that make it possible to obtain homogeneous materials with the use of production wastes as components of the mixture.

It was mentioned above that a substantial gas release occurs in the majority of applications during combustion of the mixture. This phenomena makes it more difficult to obtain a homogeneous composite.

The cure before compaction of the combustion products makes it possible to enhance homogeneity of the material, but temperature of the combustion products decreases during the cure before the compaction of the combustion products (see the accompanying drawing). Consequently, if the combustion temperature of the mixture is relatively low (and it is this temperature that determines temperature of the combustion products), it is necessary to intensify degassing of the combustion products.

In this case it is recommended that the synthesis zone be evacuated to a residual pressure of about $10^{-1}$ mmHg and below before ignition of the mixture so as to enhance homogeneity of the composite.

The lower limit of vaccum is determined by efficiency of this step, i.e. with a residual pressure above $10^{-1}$ mmHg no intensification of the process of gas release from the combustion products may take place.

It is most interesting to carry out the direct manufacture of products from a composite or synthesis of a billet of a composite that requires minimum machining.

In this case the mixture is preferably molded during compaction.

Carrying out the process of making a composite using such steps as the cure before the compaction of the combustion products, the cure of the compacted products under isobaric conditions, compaction of the combustion products under pressure with an average pressure rise rate ranging from about 10 to about 2000 kgf/cm$^2$·s allows the initial original shape to be preserved, i.e. a billet close in configuration to a finished product can be produced.

The relationship of the mixture combustion rate and temperature versus relative density of the mixture is known to have an extremum character, the optimum relative density value depending on composition of the mixture.

At the same time, the values of combustion rate and temperature determine optimum cure time values before the compaction of the combustion products, pressure rise rate and cure time of the compacted products under isobaric conditions.

The mixture is therefore preferably compacted to a relative density ranging from about 20 to about 90%.

An enormous quantity of defects are present in the mixture having a density below 20%: arches, bridges, and the like.

This results in a distortion of a combustion wave, impaired of thermal isotropy of the combustion products, i.e. in impaired homogeneity of the material.

With a mixture density above 90% parameters of its combustion are largely impaired so as to decelerate compaction and homogenization of the combustion products and impair homogeneity of the composite.

To intensify processes of afterburning, compaction and homogenization of the combustion products, it is preferred that the cure of the combustion products before the compaction, their compaction and the cure of the compacted under isobaric conditions be carried out in an ultrasonic field.

Application of ultrasonic oscillations brings about an increase in temperature of the combustion products, accelerates processes of capillary spread of the binder material, intensifies homogenization of the composite, i.e. results in enhanced homogeneity of the material.

The mixture is normally ignited by means of an electric filament, graphite electrode, induction heating, laser beam, and the like.

All such ignition methods frequently result in the apperance of defects at the ignition spot, which impairs homogeneity of the composite. The cure before the compaction of the combustion products, the cure of the compacted products under isobaric conditions, the combustion of the combustion products at an optimum rate of pressure increase allow this effect to be levelled off in the majority of applications.

In cases where it is not possible to carry out such steps, the mixture is preferably ignited by means of ultrasonic oscillations. There are no defects in the material in such case, i.e. the material is highly homogeneous.

With an increase in volume and mass of the mixture, the problem of the time of its combustion becomes very important. When the mixture is ignited at a certain spot, the cure time before the compaction of the combustion products may prove so long that the combustion products will become thermally non-homogeneous by the moment the compaction pressure is applied.

To enhance homogeneity of the composite, a perforated layer of a heat resistant material is preferable placed on the mixture surface in the synthesis zone, and an ignition composition is placed on this layer, the combustion rate of the ignition composition being at least equal to the combustion rate of the mixture, the mixture being ignited by means of the ignition composition.

In this case, after initiating the reaction in the ignition composition, the mixture combustion time materially decreases owing to the provision of a multiple-spot initiation through the perforation of the heat resistant material. The ignition composition is easily separated from the base material after the compaction pressure is relieved.

In case of a large volume and mass of the mixture, it is very important to ensure a more complete and rapid removal of adsorbed gases and low-melting impurities released during combustion.

For improving conditions for gas release, it is preferred that gas removal passages be formed in the mixture, the volume of the passages being about 60% and less of the mixture volume. An increase in the volume of the passages in excess of 60% is inexpedient as the rate of combustion of the mixture would drop to impair homogeneity of the composite.

A method for making a composite is preferably carried out in the following manner.

BEST MODE OF CARRYING OUT THE INVENTION

A mixture is prepared by one of known methods, e.g. by blending, which contains at least one metallic element of groups III-VI, VIII of the periodic table of the chemical elements and at least one compound of at least one element of said groups taken individually or in combination, at least one nonmetallic element of groups III-VI of the periodic table of the chemical elements and at least one compound of at least one element of said groups taken individually or in combination, and a binder component such as titanium, carbon and nickel.

The components of the mixture are taken in such a proportioning that their subsequent reaction under combustion conditions results in a composite of a preset composition being prepared.

For lowering production cost of a composite while retaining its high homogeneity and density, wastes of a metal of groups III-VI of the periodic table of the chemical elements and/or its alloy are used in certain applications as metallic element, e.g. grinding wastes of titanimum alloys, a nonmetallic element of groups III--VI of the periodic table of the chemical elements from production wastes such as boron fiber cuttings is used as a nonmetallic element, and a component from production wastes such as wastes from steel grinding is used as a binder component.

The blended mixture is compacted, e.g. to a density of 0.6 and molded, e.g. in the form of cylinders 160 mm in diameter and 60 mm long.

The mixture is then placed into a porous heat insulating envelope having an open porosity with a pore volume of about 60% and less of the volume of the heat insulating envelope.

The mixture should be placed into a porous heat insulating envelope in case where a composite should have a high melting point and where the starting mixture has a substantial gas saturation. In this case degassing of the combustion products is facilitated which results in enhanced homogeneity of the composite.

The mixture in the heat insulating envelope is placed into a synthesis zone, e.g. into a mold, gasostat or hydrostat, having an ingnition device, e.g. in the form of a tungsten filament.

In case the mixture has a small characteristic size, the ignition device may be made in the form of an ultrasonic transducer.

The mixture is then ignited, and for that purpose the tungsten filament which is in contact with the mixture surface at one or several spots is connected to pass electric current there through during about 0.5 seconds.

At the moment the mixture is ignited a pressure of from about 10 to about 1000 kgf/cm$^2$ is applied thereto so as to avoid disruption of continuity of the mixture during combustion.

In certain applications, the mixture is heated before the ignition by an external energy, e.g. inductor, plasma torch, ultrasonic oscillations to a temperature from about 100° to about 1200° C.

In case the mixture combustion temperature is relatively low, the synthesis zone is evacuated before ingnitiion to a residual pressure of $10^{-1}$ mmHg and below.

To enhance homogeneity of the composite in certain applications, perforated layer of a heat resistant material such as asbestos is placed on the surface of the mixture in the synthesis zone, and an ignition composition is placed on this layer, the rate of combustion of the ignition composition being at least equal to the rate of combustion of the mixture, e.g. a stoichiometric mixture of titanium and boron powders the rate of combustion of which is 1.5 times as great as that of the mixture which is ignited by means of the ignition composition.

For enhancing conditions for gas release, gas removal passages may be made in the mixture before ignition, the volume of the passages being about 60% and less of the mixture volume.

As a result of the ignition, a temperature is provided at the ignited spot or spots of the mixture, which is necessary for initiating a high-temperature exothermal reaction of components of the mixture. The combustion process will not then require employment of external heat sources and will occur on the account of heat of the exothermal reaction proper.

The mixture is cured after the ignition and before compaction of the combustion products for a time ranging from about 0.1 seconds to about 0.5 hours.

During this cure period the process of reaction of the components of the mixture proper takes place in the form of a self-propagation of the reaction zone (combustion zone) through the mixture owing to heat transfer from heated layers of the mixture to cold layers. The combustion rate is, e.g. 2 cm/s and temperature in the combustion zone is, e.g. 2700° C.

Respective compounds are formed in the combustion zone, e.g. titanium carbide, and melting and spread of the binder component occur.

It should be noted that a part of the cure period before the compaction of the combustion products during which propagation of the combustion zone through the mixture occurs is referred to as the initial stage of the cure before the compaction of the combustion products. During the entire cure period, afterreaction of the components of the mixture takes place (completeness of reaction in the combustion zone is less than unity) as well as degassing of the combustion products and their homogenization.

In certain applications, the ignition and the initial stage of the cure before the compaction of the combustion products are carried out under a pressure ranging from about 10 to about 1000 kgf/cm$^2$, the pressure being relieved after completion of the initial stage, thr remaining cure period being carried out without application of pressure.

In certain cases the ignition and the entire cure are carried out under a pressure ranging from about 10 to about 1000 kgf/cm$^2$.

When the cure is completed, the hot combustion products are compacted under a pressure of, e.g. 1500 kgf/cm$^2$ with an average rate of pressure rise ranging from about 10 to about 2000 kgf/cm$^2$·s.

Then the compacted product is cured under isobaric conditions, e.g. under a pressure of 1400 kgf/cm$^2$ during e.g. 60 seconds.

In case the mixture has a small characteristic volume size, the cure of the hot combustion products before the compaction, their compaction and the cure of the compacted products under isobaric conditions are carried out in an ultrasonic oscillations field.

After the cure of the compacted product under isobaric conditions is over, the resultant composite is cooled, e.g. in the air or at a preset rate, e.g. of 200 deg./h.

In certain applications, the composite is heat treated before cooling, e.g. under relaxation annealing conditions.

The composite may be normalized after cooling.

Better understanding of the invention may be had from the following examples of practical implementation of the method according to the invention. Homogeneity of the composites prepared as described in the examples and of the materials prepared using conventional techniques (prior art) determined by the abivedescribed methods is given in the Table following the examples.

EXAMPLE 1

A mixture containing in % by mass: titanium 63.10, boron 28.4 and a nickel-copper alloy 8.5 was blended.

The mixture was compacted under the pressure of 200 kgf/cm$^2$, placed into a synthesis zone, ignited with subsequent reaction of the components of the mixture under combustion conditions, and cured during 0.1 s, whereafter the hot combustion products were compacted under the pressure of 800 kgf/cm$^2$ at the average pressure rise rate of 2000 kgf/cm$^2$·s, with subsequent cure of the compacted product under isobaric conditions under the pressure of 800 kgf/cm$^2$ during two seconds.

Characteristics of the resultant composite are given in the Table.

EXAMPLE 2

A mixture containing in % by mass: zirconium 9.81, tantalum 62.18, carbon 9.03, tantalum pentoxide 18.98 was blended.

The mixture was compacted under the pressure of 300 kgf/cm$^2$, placed into a synthesis zone, ignited with subsequent reaction of the components of the mixture under combustion conditions, cured during 0.5 hours, and the hot combustion products were compacted under the pressure of 1000 kgf/cm$^2$ at the average rate of pressure rise of 10 kgf/cm$^2$, whereafter the compacted product was cured under isobaric conditions under the pressure of 1500 kgf/cm$^2$ during five minutes.

Characteristics of the resultant composite are given in the Table.

EXAMPLE 3

A mixture containing in % by mass: titanium 71.39, boron 7.83, carbon 10.28, boron carbide 5.00 and iron 5.5 was blended.

The mixture was compacted under the pressure of 250 kgf/cm$^2$, placed into a synthesis zone, ignited with subsequent reaction of the components of the mixture under combustion conditions, cured during 0.1 hours, and the hot combustion products were compacted under pressure with the average pressure rise rate of 1000 kgf/cm$^2$·s, with subsequents isobaric cure of the compacted product under the pressure of 1000 kgf/cm² during 10 minutes.

Characteristics of the resultant composite are given in the Table.

EXAMPLE 4

A mixture containing in % by mass: titanium 48, chromium 17.4, carbon 14.6, titaniun nitride 10, nichrome 10 was blended.

The mixture was compacted under the pressure of 100 kgf/cm², placed into a synthesis zone, ignited with subsequent reaction of the components of the mixture under combustion conditions, cured for 20 seconds, and the hot combustion products were compacted under the pressure of 1500 kgf/cm² at the average rate of pressure rise of 800 kgf/cm²·s, with subsequent isobaric cure of the compacted product during two minutes.

Characteristics of the resultant composite are given in Table 1.

EXAMPLE 5

A mixture containing in % by mass: molybdenum 50, silicon 30, nickel 10 and aluminium 10 was blended.

The mixture was compacted under the pressure of 120 kgf/cm², placed into a synthesis zone, ignited with subsequent reaction of the components of the mixture under combustion conditions, cured gor 40 seconds, and the hot combustion products were compacted under the pressure of 3000 kgf/cm² at the average pressure rise rate of 20 kgf/cm²·s with subsequent isobaric cure of the compacted product during five minutes.

Characteristics of the composite are given in Table 1.

EXAMPLE 6

A mixture containing in % by mass 89.2 of titanium and 10.8 of boron was blended.

The mixture was compacted under the pressure of 80 kgf/cm², placed into a synthesis zone, ignited with subsequent reaction of the components of the mixture under combustion conditions, cured for 10 seconds, and the hot combustion products were compacted under the pressure of 4000 kgf/cm² at the average pressure rise rate of 1300 kgf/cm²·s, with subsequent isobaric cure under the pressure of 4000 kgf/cm² during six minutes.

The hot composite was heat treated immediately after pressure relief under relaxation annealing conditions in an oven by heating to 1000° C., cure at this temperature during six hours and cooling with oven.

Characteristics of the resultant composite are given in the Table.

EXAMPLE 7

A mixture containing in % by mass: titanium 48, carbon 12, and 40% by mass of steel containing in % by mass carbon 1.0–1.2, manganese 10–13, iron—the balance was blended.

The mixture was compacted under the pressure of 40 kgf/cm², placed into a synthesis zone, ignited with subsequent reaction of the components of the mixture under combustion conditions, cured during 15 second, and the hot combustion products were compacted under the pressure of 2500 kgf/cm² at the average pressure rise rate of 1500 kgf/cm²·s, with subsequent isobaric cure of the compacted product under the pressure of 2000 kgf/cm² during four minutes.

The composite was cooled in the air after pressure relief.

The composite was heat treated after cooling by annealing by heating in an oven to 920° C., cure at this temperature for two hours and slow cooling with the oven.

Characteristics of the resultant composite are given in the Table.

EXAMPLE 8

A mixture containing in % by mass: titanium 48, carbon 12, titanium nitride 20, nickel 15 and molybdenum 5 was blended.

The mixture was compacted under the pressure of 90 kgf/cm², placed into a synthesis zone, ignited with subsequent reaction of the components of the mixture under combustion conditions, cured during 40 seconds, and the hot combustion products were compacted under the pressure of 600 kgf/cm² at the average rate of pressure rise of 1100 kgf/cm²·s, with subsequent isobaric cure of the compacted product under the pressure of 600 kgf/cm² during three minutes.

The resultant composite was heat treated by hardening after pressure relief by an abrupt cooling in molten lead at 340° C., cure therein for two hours and slow cooling at a rate of 500 deg/h in the air.

Characteristics of the resultant composite are given in the Table.

EXAMPLE 9

A mixture containing in % by mass: molybdenum 50, silicon 30, aluminum oxide 30 was blended.

The mixture was compacted under the pressure of 140 kgf/cm², placed into a synthesis zone, ignited with subsequent reaction of the components of the mixture under combustion conditions, cured during 50 seconds under the pressure of 500 kgf/cm², and the hot combustion products were compacted under the pressure of 1000 kgf/cm² at the average rate of pressure rise of 900 kgf/cm²·s, with subsequent isobaric cure of the compacted product under the pressure of 500 kgf/cm² during 18 minutes.

The composite was cooled after pressure relief at the average rate of 5000 deg./h and then heat treated by annealing in an oven at 1000° C. during six hours and slow cooling with the oven.

Characteristics of the resultant composite are given in the Table.

EXAMPLE 10

A mixture containing in % by mass: titanium 63.1, boron 28.4, a cobalt-copper alloy 8 and yttrium 0.5 was blended.

The mixture was compacted under the pressure of 250 kgf/cm², placed into a synthesis zone, ignited with subsequent reaction of the components of the mixture under combustion conditions, cured during three seconds under the pressure of 10 kgf/cm², and the hot combustion products were compacted under the pressure of 1500 kgf/cm² at the average pressure rise rate of 1800 kgf/cm²·s, with subsequent isobaric cure of the compacted product under the pressure of 1500 kgf/cm² during ten seconds.

The hot composite was heat treated by tempering with the average cooling rate of 10 deg./h.

Characteristics of the resultant composite are given in the Table.

EXAMPLE 11

A mixture containing in % by mass: titanium 48, chromium 17.4, carbon 14.6 and 20% by mass of steel containing in % by mass: chromium 16-20, nickel 12-16, carbon 0.05-0.1, iron—the balance was blended.

The mixture was compacted under the pressure of 300 kgf/cm$^2$, placed into a synthesis zone, ignited with subsequent reaction of the components of the mixture under combustion conditions, cured during 60 seconds under the pressure of 1000 kgf/cm$^2$, and the hot combustion products were compacted under the pressure of 2500 kgf/cm$^2$ at the average pressure rise rate of 450 kgf/cm$^2$·s, with subsequent isobaric cure of the compacted product under the pressure of 2500 kgf/cm$^2$ during three minutes.

The resultant composite was cooled in the air after pressure relief and then heat treated by tempering by heating to 700° C., curing for three hours and cooling at the average rate of 200 deg./h.

Characteristics of the resultant composite are given in the Table.

EXAMPLE 12

A mixture containing in % by mass: titanium 71.4, boron 7.8, carbon 10.3 and vanadium carbide 5.5 was blended.

The mixture was compacted under the pressure of 130 kgf/cm$^2$, placed into a synthesis zone, ignited with subsequent reaction of the components of the mixture under combustion conditions, cured during 50 seconds, the mixture being ignited and cured at the initial cure stage during 15 seconds under pressure of 400 kgf/cm$^2$, the hot combustion products were then compacted under the pressure of 1800 kgf/cm$^2$ at the average pressure rise rate of 700 kgf/cm$^2$·s, with subsequent isobaric cure of the compacted product under the pressure of 400 kgf/cm$^2$ during seven minutes.

Characteristics of the resultant composite are given in Table 1.

EXAMPLE 13

A mixture containing in % by mass: zirconium 9.8, tantalum 62.2, carbon 9 and cobalt 19 was blended.

The mixture was compacted under the pressure of 190 kgf/cm$^2$ and placed into a synthesis zone. The mixture was heated to 800° C. with a plasma torch before ignition.

The mixture was then ignition with subsequent reaction of the components of the mixture under combustion conditions, cured for 40 seconds, the ignition of the mixture and initial stage of the cure during 20 seconds being carried out under the pressure of 1000 kgf/cm$^2$, with subsequent compaction of the hot combustion products under the pressure of 3000 kgf/cm$^2$ at the average pressure rise rate of 90 kgf/cm$^2$·s, with subsequent isobaric cure of the compacted product under the pressure of 3000 kgf/cm$^2$ during one minute.

Characteristics of the resultant composite are given in the Table.

EXAMPLE 14

A mixture containing in % by mass: titanium 71.4, boron 8.6, and zirconium nitride 20 was blended.

The mixture was compacted under the pressure of 240 kgf/cm$^2$, placed into a porous heat insulating envelope and then placed into a synthesis zone.

The mixture was heated before ignition by directly passing electric current therethrough to 100° C.

The mixture was then ignited was subsequent reaction of the components of the mixture under combustion conditions, cured for 120 seconds, the ignition of the mixture and the initial stage of the cure being carried out during 40 seconds under the pressure of 10 kgf/cm$^2$, with subsequent compaction of the hot reaction products under the pressure of 2500 kgf/cm$^2$ at the average rate of pressure rise of 1800 kgf/cm$^2$·s, with subsequent isobaric cure of the compacted product under the pressure of 2500 kgf/cm$^2$ during eight minutes.

Characteristics of the resultant composite are given in the Table.

EXAMPLE 15

A mixture containing in % by mass: tantalum 84.4, carbon 5.6 and copper tantalate 10 was blended.

The mixture was compacted under the pressure of 140 kgf/cm$^2$, placed into a porous best insulating envelope with an open porosity of 60% and then placed into a synthesis zone.

The mixture was heated before ignition to 1200° C. by means of an inductor and was then ignited with subsequent reaction of the components of the mixture under combustion conditions, cured during 130 seconds, and then hot combustion products were compacted under the pressure of 3000 kgf/cm$^2$ at the average rate of pressure rise of 1300 kgf/cm$^2$·s. The compacted product was then isobarically cured under the pressure of 1300 kgf/cm$^2$ during 15 minutes.

Characteristics of the resultant composite are given in the Table.

EXAMPLE 16

A mixture containing in % by mass: titanium chips 40.47, carbon 9.92, nickel 41.46, molybdenum 8.15 was blended.

The mixture was compacted under the pressure of 90 kgf/cm$^2$, placed into a porous heat insulating envelope with an open porosity of 30% and then into a synthesis zone. The mixture was ignited with subsequent reaction of the components of the mixture under combustion conditions, cured for 40 seconds, and the hot combustion products were compacted under the pressure of 1100 kgf/cm$^2$ at the average rate of pressure rise of 350 kgf/cm$^2$·s. The compacted product was then isobarically cured under the pressure of 1100 kgf/cm$^2$ during three minutes.

Characteristics of the resultant composite are given in the Table.

EXAMPLE 17

A mixture containing in % by mass; wastes of grinding of titanium alloys 71.39, boron 7.83, carbon wastes 10.28 and iron 10.5 was blended.

The mixture was compacted under the pressure of 160 kgf/cm$^2$, placed into a synthesis zone, ignited with subsequent reaction of the components of the mixture under combustion conditions and cured during eight seconds, the hot combustion products were compacted under the pressure of 1400 kgf/cm$^2$ at the average pressure rise rate of 50 kgf/cm$^2$·s, with subsequent cure under isobaric conditions of the compacted product under the pressure of 1400 kgf/cm$^2$ during one minute.

Characteristics of the resultant composite are given in the Table.

EXAMPLE 18

A mixture containing in % by mass: titanium grinding wastes 15.30, titanium alloy grinding wastes 25.17, carbon 9.92, and 49.61% by mass of grinding wastes of steel containing in % by mass: carbon 0.21–0.4, chromium 1.2–1.4, manganese 1.2–1.4, silicon 1.2–1.4, iron—the balance was blended.

The mixture was compacted under the pressure of 190 kgf/cm$^2$, placed into a synthesis zone, ignited with subsequent reaction of the components of the mixture under combustion conditions, cured during 30 seconds, and the hot combustion products were compacted under the pressure of 1900 kgf/cm$^2$ at the average rate of pressure rise of 90 kgf/cm$^2$·s. Then isobaric cure of the compacted product was carried out under the pressure of 1900 kgf/cm$^2$ during 1.5 minutes.

Characteristics of the resultant composite are given in the Table.

EXAMPLE 19

A mixture containing in % by mass: titanium 48, chromium 17.4, carbon 14.6 and 20% by mass of steel containing in by mass: chromium 16–20, nickel 7–10, titanium 0.5–0.8, iron—the balance was blended.

The mixture was compacted under the pressure of 180 kgf/cm$^2$ and placed into a synthesis zone which was evacuated to the residual pressure of 10$^{-1}$ mmHg.

The mixture was then ignited with subsequent reaction of the components of the mixture under combustion conditions, cured during five seconds, and the hot combustion products were compacted under the pressure of 3600 kgf/cm$^2$ at the average pressure rise rate of 200 kgf/cm$^2$·s, with subsequent isobaris cure of the compacted product under the pressure of 3600 kgf/cm$^2$ during 60 seconds.

Characteristics of the resultant composite are given in the Table.

EXAMPLE 20

A mixture containing in % by mass: titanium 89.2 and boron 10.8 was blended.

The mixture was molded into cylindrical samples 500 mm in diameter and 100 mm long and was then placed into a synthesis zone which was evacuated to the residual pressure of 10$^{-2}$ mmHg, ignited with—subsequent reaction of the components of the mixture under combustion conditions, cured during two minutes, and the hot combustion products were compacted under the pressure of 900 kgf/cm$^2$ at the average pressure rise rate of 300 kgf/cm$^2$·s, isobaric cure of the compacted product was then carried out under the pressure of 900 kgf/cm$^2$ during six minutes.

Characteristics of the resultant composite are given in the Table.

EXAMPLE 21

A mixture containing in % by mass: molybdenum 50, silicon 30 and aluminum oxide 20 was blended.

The mixture was molded into a hexahedral plate with a relative density of 50% and then placed into a synthesis zone, ignited with subsequent reaction of the components of the mixture under combustion conditions, cured during four minutes, and the hot combustion products were compacted under the pressure of 2900 kgf/cm$^2$ at the average pressure rise rate of 40 kgf/cm$^2$·s. Then isobaric cure of the compacted product was carried out under the pressure of 2900 kgf/cm$^2$ during ten minutes.

Characteristics of the resultant composite are given in the Table.

EXAMPLE 22

A mixture containing in % by mass: tantalum 84.4, carbon 5.6 and 10% by mass of steel containing in % by mass: carbon 0.05–0.1, nickel 12–16, iron—balance was blanded.

The mixture was compacted to a relative density of 90% and placed into a synthesis zone, ignited with subseqeunt reaction of the components of the mixture under combustion conditions, cured during 40 seconds, and the hot combustion products were compacted under the pressure of 3000 kgf/cm$^2$ at the average pressure rise rate of 80 kgf/cm$^2$·s. Then isobaric cure of the compacted product was carried out under the pressure of 3000 kgf/cm$^2$ during eight minutes, the cure of the hot combustion products and the isobaric cure of the compacted product being carried out in an ultrasonic field.

Characteristics of the resultant composite are given in the Table.

EXAMPLE 23

A mixture containing in % by mass: titanium 48, carbon 12 and nickel 40 was blended.

The mixture was compacted to a relative density of 20%, placed into a synthesis zone, ignited by means of a tungsten filament with subsequent reaction of the components of the mixture under combustion conditions, cured for seconds, and the hot combustion products were compacted under the pressure of 1000 kgf/cm$^2$ at the average pressure rise rate of 100 kgf/cm$^2$·s. Isobaric cure of the compacted product was then carried out under the pressure of 1000 kgf/cm$^2$ during one minute.

Characteristics of the resultant composite are given in the Table.

EXAMPLE 24

A mixture containing in % by mass: titanium 64, carbon 16 and cobalt 20 was blended.

The mixture was compacted under the pressure of 200 kgf/cm$^2$, placed into a synthesis zone, a perforated layer of a heatresistant material was placed on the mixture surface, and an ignition composition having a combustion rate equal to that of the mixture was placed on this layer, (the composition containing % by mass: Ti - 64, C - 16, TiG-20), the mixture was ignited by means of the ignition composition. The ignition composition was ignited by a graphite electrode with subsequent reaction of the components of the mixture under combustion conditions, the mixture was cured for 10 seconds, and the hot combustion products were compacted under the pressure of 1000 kgf/cm$^2$ at the average pressure rise rate of 60 kgf/cm$^2$·s, with subsequent isobaric cure of the compacted product under the pressure of 1000 kgf/cm$^2$ during two minutes.

Characteristics of the resultant composite are given in the Table.

EXAMPLE 25

A mixture containing in % by mass: titanium 47.9, boron 21.6 and 20.5% by mass of steel containing in % by mass: chromium 26–20, nickel 9–11, titanium 0.5–0.8, carbon 0.05–0.1, iron—the balance was blended.

The mixture was compacted under the pressure of 110 kgf/cm², placed into a synthesis zone, gas removal passage were formed in the mixture with the passages volume of 60% of the mixture volume, the mixture was ignited by means of an induction heater, with subsequent reaction of the components of the mixture under combustion conditions, cured during 30 seconds, and the hot combustion products were compacted under the pressure of 600 kgf/cm² at the average pressure rise rate of 70 kgf/cm²·s. Isobaric cure of the compacted product was then carried out under the pressure of 600 kgf/cm² during three minutes.

Characteristics of the resultant composite are given in the Table.

EXAMPLE 26

A mixture containing in % by mass: titanium 64, carbon 16 and nickel 20 was blended.

The mixture was compacted under the pressure of 180 kgf/cm², placed into a synthesis zone, and gas removal passages were formed in the mixture with the passages volume amounting to 30% of the mixture volume, the mixture was ignited by means of a laser beam, with subsequent reaction of the components of the mixture under combustion conditions, cured for 50 seconds, and the hot combustion products were compacted under the pressure of 4000 kgf/cm² at the average pressure rise rate of 560 kgf/cm²·s. Then isobaric cure of the compacted product was carried out under the pressure of 4000 kgf/cm² during 2.5 minutes.

Characteristics of the resultant composite are given in the Table.

EXAMPLE 27

A mixture containing in % by mass: titanium 32, carbon 8, nickel 50 and molybdenum 10 was blended.

The mixture was compacted under the pressure of 360 kgf/cm², placed into a synthesis zone and ignited by means of ultrasonic oscillations, with subsequent reaction of the components of the mixture under combustion conditions, cured during 70 seconds, and the hot combustion products were compacted under the pressure of 2000 kgf/cm² at the average rate of pressure rise of 700 kgf/cm²·s. The compacted product was then isobarically cured under the pressure of 2000 kgf/cm² during seven minutes.

Characteristics of the resultant composite are given in the Table.

EXAMPLE 28

A mixture containing in % by mass: titanium 48, carbon 12, titanium nitride 10 and nickel 30 was blended.

The mixture was compacted under the pressure of 110 kgf/cm², placed into a synthesis zone, a perforated layer of a heat-resistant material was placed on the mixture surface and an ignition composition having a combustion rate which is four times as high as that of the mixture was placed on this layer (the composition containing % by mass: Ti - 69; B - 31), the mixture was ignited, with subsequent reaction of the components of the mixture under combustion conditions, cured during 15 seconds, and the hot combustion products were compacted under the pressure of 1500 kgf/cm² at the average rate of pressure rise of 800 kgf/cm²·s. Then isobaric cure of the compacted products was carried out under the pressure of 1500 kgf/cm² during 50 seconds.

Characteristics of the resultant composite are given in the Table.

EXAMPLE 29

For the sake of comparison, here is an example of implementation of a method for making a hard alloy material according to EP No. OI65707 A2.

A mixture containing in % by mass: titanium 76.87 and boron 23.13 was blended.

The mixture was compacted in a mold under the pressure of 2000 kgf/cm².

The mixture was molded during compaction into cylinders 5 mm in diameter and 5 mm long.

The compacted mixture was then placed into an envelope made of boron nitride which was placed into a high-pressure apparatus having a graphite heater.

The mixture was ignited by the graphite heater with simultaneous application of the pressure of 3000 atm to the mixture.

Characteristics of the resultant hard alloy material are given in the Table.

The following characteristics of composites prepared using the abovedescribed method were determined in all examples: homogeneity of chemical composition and uniformity of density of a composite.

Homogeneity and uniformity were determined by the formula:

$$K\sqrt{\frac{\sum_{i=1}^{11}(\overline{C} - C_i)^2}{n-1}},$$

wherein
K is the coefficient of non-uniformity of a composity;
$\overline{C}$ is the average value of a property (e.g. titanium content or density of a composite) over the volume of a composite based on results of all measurements;
$C_i$ is the value of a respective property obtained from one measurement;
n - number of measurements.

TABLE

| Example 1 | Method for making a composite 2 | Coefficient of non-uniformity of chemical composition of a composite 3 | Coefficient of non-uniformity of density of a composite 4 |
| --- | --- | --- | --- |
| 1 | According to the invention | 0.11 | 0.09 |
| 2 | According to the invention | 0.13 | 0.17 |
| 3 | According to the invention | 0.09 | 0.10 |
| 4 | According to the invention | 0.07 | 0.05 |
| 5 | According to the invention | 0.05 | 0.12 |
| 6 | According to the invention | 0.08 | 0.06 |
| 7 | According to the invention | 0.14 | 0.10 |
| 8 | According to the invention | 0.12 | 0.11 |
| 9 | According to the invention | 0.15 | 0.15 |
| 10 | According to the invention | 0.10 | 0.09 |
| 11 | According to the invention | 0.05 | 0.05 |

TABLE-continued

| Example 1 | Method for making a composite 2 | Coefficient of non-uniformity of chemical composition of a composite 3 | Coefficient of non-uniformity of density of a composite 4 |
|---|---|---|---|
| 12 | According to the invention | 0.07 | 0.10 |
| 13 | According to the invention | 0.15 | 0.16 |
| 14 | According to the invention | 0.09 | 0.09 |
| 15 | According to the invention | 0.13 | 0.15 |
| 16 | According to the invention | 0.13 | 0.17 |
| 17 | According to the invention | 0.15 | 0.13 |
| 18 | According to the invention | 0.10 | 0.09 |
| 19 | According to the invention | 0.06 | 0.05 |
| 20 | According to the invention | 0.05 | 0.05 |
| 21 | According to the invention | 0.17 | 0.15 |
| 22 | According to the invention | 0.12 | 0.11 |
| 23 | According to the invention | 0.05 | 0.05 |
| 24 | According to the invention | 0.05 | 0.05 |
| 25 | According to the invention | 0.08 | 0.09 |
| 26 | According to the invention | 0.05 | 0.05 |
| 27 | According to the invention | 0.05 | 0.05 |
| 28 | According to the invention | 0.13 | 0.11 |
| 29 | Prior art | 0.43 | 0.37 |

The lowest value of the coefficient of non-uniformity (0.05) is determined by accuracy of the analysis method used.

It can be seen from the above Table that a composite prepared by the method according to the invention features high homogeneity of chemical composition and uniformity of density.

INDUSTRIAL APPLICABILITY

The invention may be advantageously used in the metallurgical and machine tool manufacturing inductries, in the electrical engineering for the manufacture of cutting tools, hard alloy tooling and dies and other products from a composite made by the method according to the invention.

We claim:

1. A method for making a composite, comprising blending a mixture containing at least one metallic element of groups III-VI, VIII of the periodic table of the chemical elements and at least one compound of at least one of the elements of said groups taken individually or in combination, at least one nonmetallic element of groups III-VI of the periodic table of the chemical elements and at least one compound of at least one of the elements of said groups taken individually or in combination, and a binder component, compacting the mixture, placing the mixture into a synthesis zone, igniting the mixture with subsequent reaction of the components of the mixture under combustion conditions, and compacting the hot combustion products to obtain an end composite, characterized in that after ignition the mixture is cured till compaction of hot products during a period ranging from about 0.1 seconds to about 0.5 hours, and compacting the hot combustion products is carried out under pressure at an average rate of pressure rise ranging from about 10 to about 2000 kgf/cm$^2$·s, with subsequent cure of the compacted product under isobaric conditions to complete homogenization of the composite and subsequent cooling.

2. A method as claimed in claim 1, characterized in that the composite is heat treated after homogenization and before cooling.

3. A method as claimed in claim 1, characterized in that the composite is heat treated after cooling.

4. A method as claimed in claims 2 or 3, characterized in that cooling of said composite is carried out at an average rate ranging from about 10 to about 5000 deg./h.

5. A method as claimed in claim 1, characterized in that at least at the moment of ignition of mixture and during the initial stage of cure before compaction of the combustion products a pressure ranging from about 10 to about 1000 kgf/cm$^2$ is built up.

6. A method as claimed in claim 5, characterized in that said pressure is maintained during the entire cure period before compaction of said combustion products.

7. A method as claimed in claim 1, characterized in that the mixture is heated using an external energy supply to a temperature ranging from about 100° to about 1200° C. before ignition of said mixture.

8. A method as claimed in claim 1, characterized in that the mixture is placed into a heat insulating porous envelope after the compaction of the mixture.

9. A method as claimed in claim 8, characterized in that the heat insulating envelope has an open porosity, the volume of the open porosity being about 60% and less of the volume of the heat insulating envelope.

10. A method as claimed in claim 1 or 9, characterized in that the synthesis zone is evacuated to a residual pressure of about 10$^{-1}$ mmHg and below before said ignition of said mixture.

11. A method as claimed in claim 1, characterized in that compaction of said mixture is carried out to a relative density ranging from about 20% to about 90%.

12. A method as claimed in claim 11, characterized in that the mixture is molded during compaction of the mixture.

13. A method as claimed in claim 1, characterized in that the cure before compaction of the hot combustion products, the compaction of the hot combustion products and the cure of the compacted product under isobaric conditions are carried out in an ultrasonic field.

14. A method as claimed in claim 1, characterized in that the ignition of the mixture is carried out by means of ultrasonic oscillations.

15. A method as claimed in claim 1, characterized in that a perforated layer of a heat resistant material is placed on the surface of the mixture in the synthesis zone and an ignition composition having a combustion rate which is at least equal to that of the mixture is placed on this layer, the ignition of the mixture being carried out by means of the ignition composition.

16. A method as claimed in claim 1, characterized in that gas removal passages are formed in the mixture before the ignition, the volume of the passages being about 60% and less of the volume of the mixture.

17. A method as claimed in claim 1, characterized in that the metallic element is in the form of wastes of a metal of groups III–VI, VIII of the periodic table of the chemical elements and/or an alloy thereof.

18. A method as claimed in claim 1, characterized in that the nonmetallic element is in the form of a production waste of a nonmetallic element of groups III–VI of the periodic table of the chemical elements.

19. A method as claimed in claim 1, characterized in that the binder component is in the form of a production waste of a binder component.

* * * * *